Figure 1:
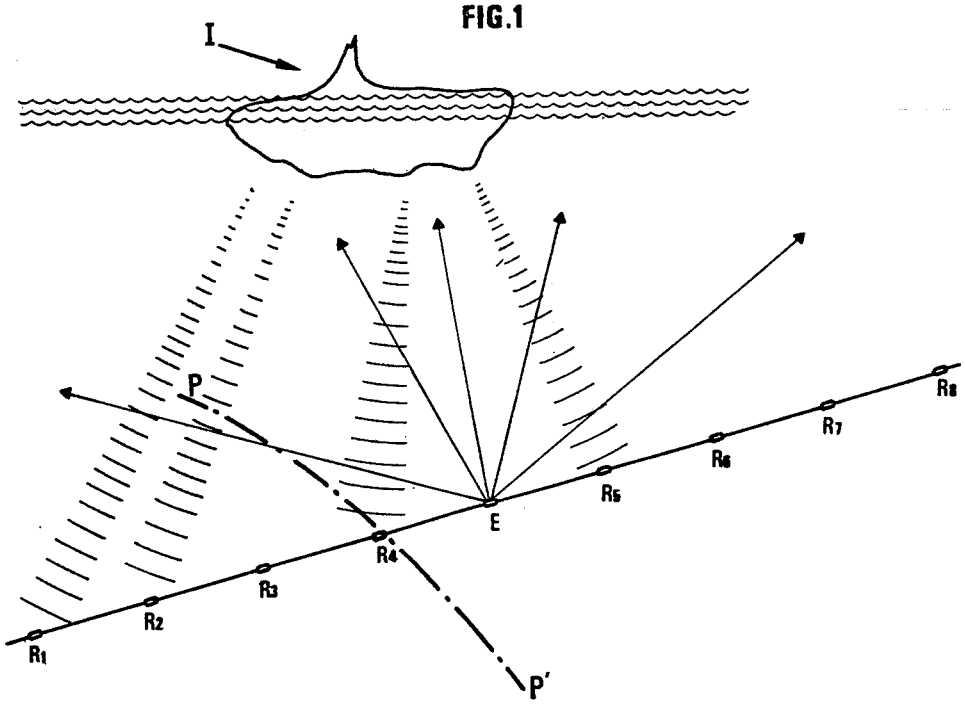

United States Patent [19]

Desbrandes

[11] 4,208,731
[45] Jun. 17, 1980

[54] METHOD AND DEVICE FOR DETERMINING THE GEOMETRICAL OUTLINE OF THE UNDERWATER PART OF ICEBERGS AND THE DRAUGHT THEREOF

[75] Inventor: Robert Desbrandes, Sevres, France
[73] Assignee: Institut Francais du Petrole, France
[21] Appl. No.: 873,874
[22] Filed: Jan. 31, 1978
[30] Foreign Application Priority Data
   Feb. 2, 1977 [FR] France ............................ 77 03101
[51] Int. Cl.² .......................... G01S 9/66; G01S 7/60
[52] U.S. Cl. ........................................ 367/11; 367/90; 367/115; 367/900
[58] Field of Search .................... 340/1 R, 3 F, 3 R
[56] References Cited
   U.S. PATENT DOCUMENTS
   3,267,416  8/1966  Morse ........................... 340/3 F

| | | | |
|---|---|---|---|
| 4,023,175 | 5/1977 | Brown et al. | 340/1 R |
| 4,103,278 | 7/1978 | Satake et al. | 340/1 R |

*Primary Examiner*—Richard A. Farley
*Attorney, Agent, or Firm*—Craig and Antonelli

[57] ABSTRACT

This method comprises laying onto the water bottom at least one line of acoustic transducers which are put in energized condition when an iceberg is approaching the location of this line. Acoustic signals are then sequentially transmitted from at least one of said transducers, some of them being reflected by the underwater part of the iceberg and sensed by acoustic receivers located on both sides of the transmitter on the transducer line. The outline of the underwater portion of the iceberg and its draught are determined by automatically drawing the geometrical envelopes of a system of ellipsoids whose foci are the transmitter and the different receivers.

8 Claims, 12 Drawing Figures

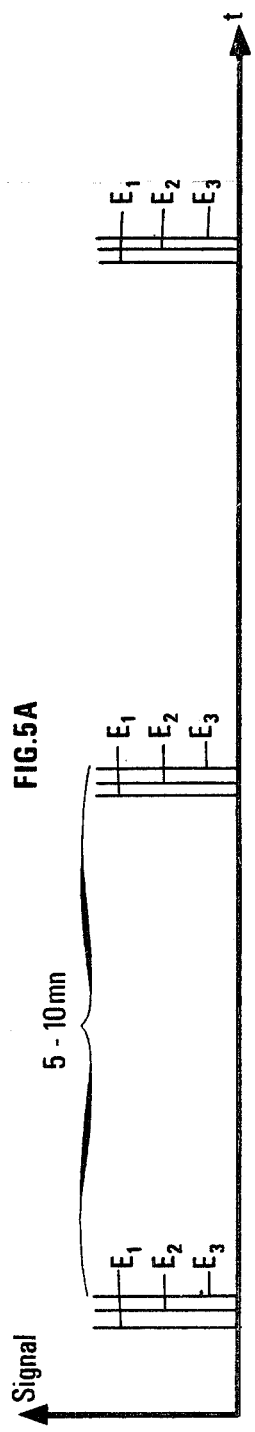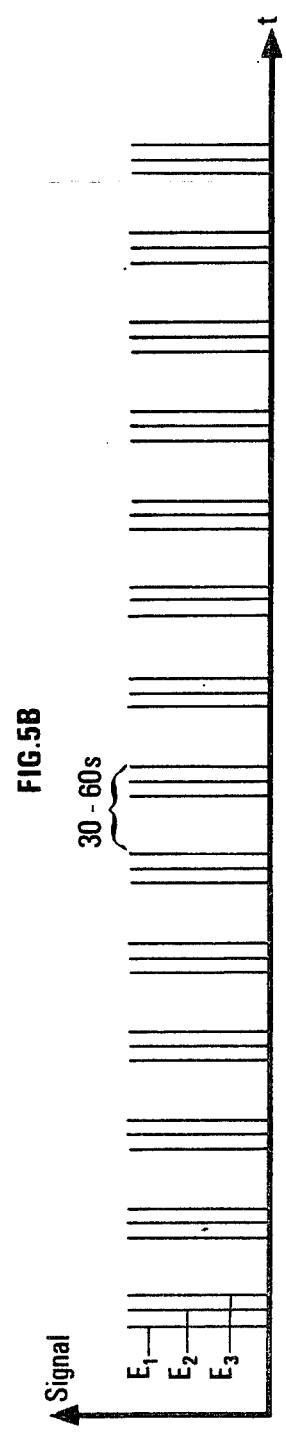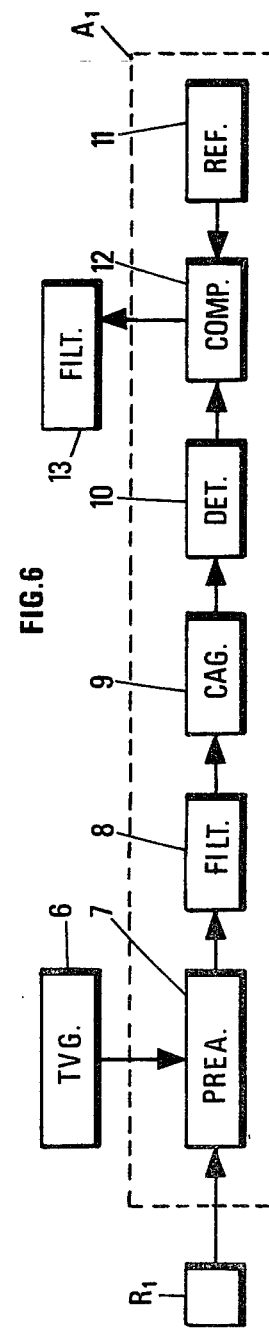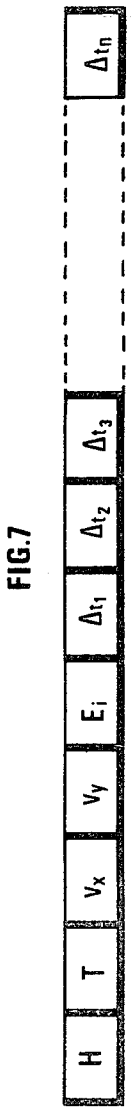

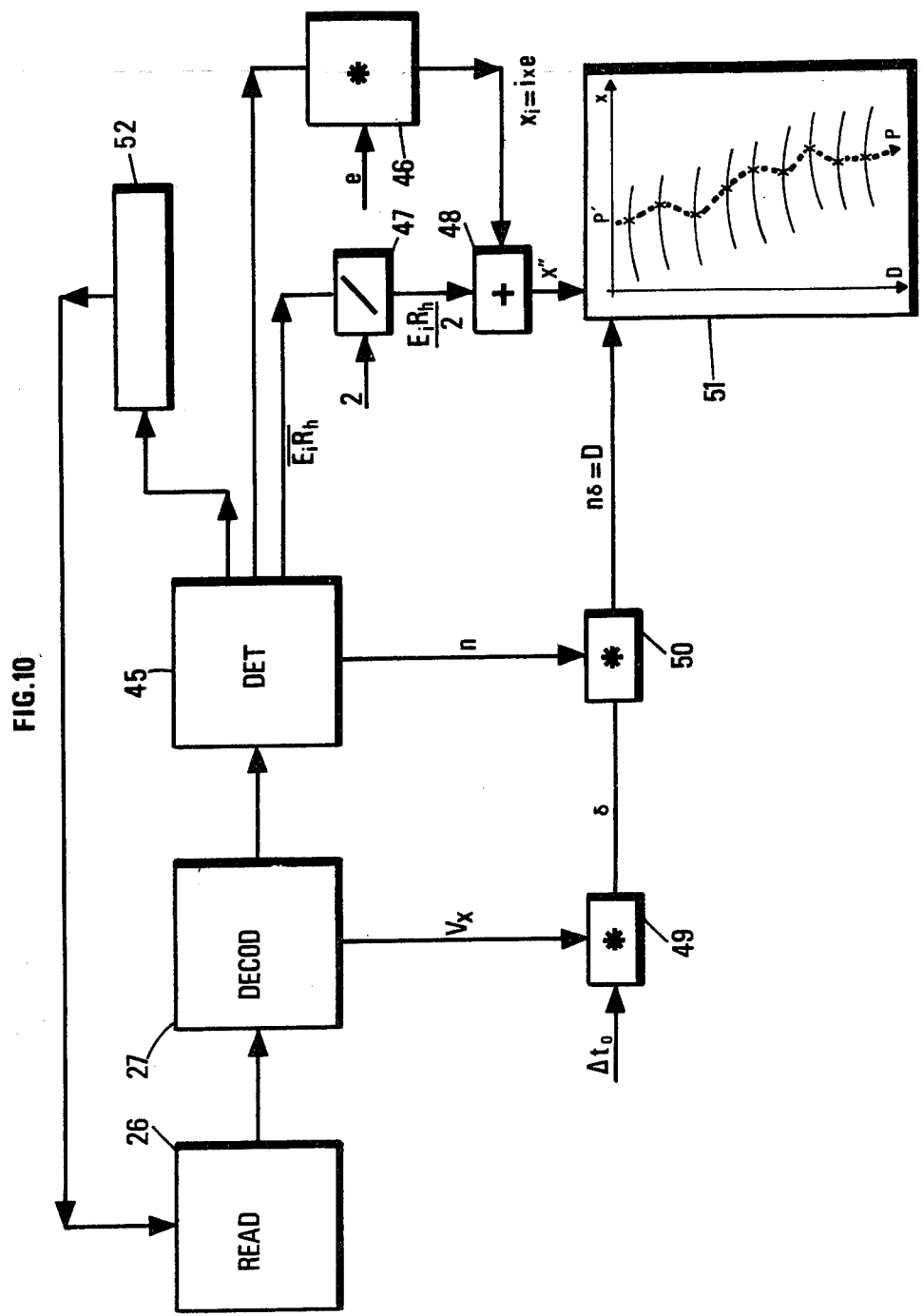

METHOD AND DEVICE FOR DETERMINING THE GEOMETRICAL OUTLINE OF THE UNDERWATER PART OF ICEBERGS AND THE DRAUGHT THEREOF

The present invention relates to a method and a device for determining the geometrical outline of the underwater part of icebergs and the draught thereof.

Knowledge of the underwater part of icebergs and of their draught is in particular important during offshore drilling and production operations in the area where icebergs use to drift, since the latter, when passing on the locations where such operations are carried out are likely to tear away from the underwater installations, such as underwater well heads and the elements topping the same.

It has already been proposed to use transmitter-receiver devices of the sonar type to survey the underwater part of icebergs.

According to a first method, there is lowered from a ship, in the immediate vicinity of the iceberg, a sidewards transmitting sonar whose ultrasonic beam scans the iceberg wall in a horizontal plane at the depth of immersion of the sonar.

This method gives inaccurate data, particularly near the bottom of the iceberg, owing to parasitic reflections from the water bottom. Moreover the application of this method is only possible if the weather conditions are favourable, and it presents real hazards, since approaching an iceberg with a vessel is always dangerous (risks of collision with the iceberg and of tilting thereof).

Another method consists in laying onto the water bottom a network of sonar transmitters scanning area on survey. This method, however, requires a complex electronic system and moreover such scanning of the underwater part of the iceberg by acoustic beams may leave some "shadow zones," thus causing, in particular, some uncertainty regarding the value of the iceberg draught.

The invention provides a simpler method and apparatus which does not suffer from the above drawbacks and can provide data on all the icebergs crossing the area on survey.

If so desired, this data can be transmitted over large distances under any weather conditions.

The invention provides a method comprising laying in a fixed underwater location at least one line of acoustic transducers comprising at least one element for transmitting acoustic signals towards the water surface and a plurality of acoustic receivers, this method comprising the combination of the following steps:

(a) putting in energized condition this transducer line when an iceberg is approaching it, (b) monitoring then, at regular time intervals, the transmission of acoustic signals from said transmission element, some of said signals being reflected by the underwater part of the iceberg and reaching the acoustic receivers, (c) detecting said reflected signals, determining their propagation time between the transmitting element and at least some of the receivers of the line, located on both sides of said transmission element, and deducing from this determination the corresponding distances over which the acoustic signals have travelled, their propagation velocity through water being known, (d) repeating steps (b) and (c) and determining a set of values comprising the minimum minimorum value of said propagation time for one and the same transmitted signal corresponding substantially to the passage of the lowest point of the iceberg in a vertical plane, and (e) deducing from said set of minimum values of the propagation time, the geometrical configuration of the underwater part of the iceberg, in cross-section by said vertical plane, and also the draught of this iceberg.

Figure 4:
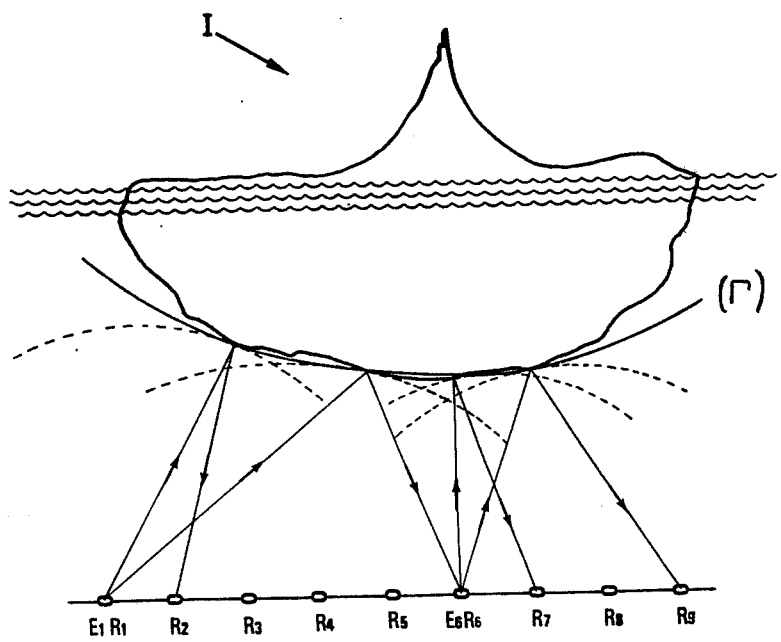
Figure 2:
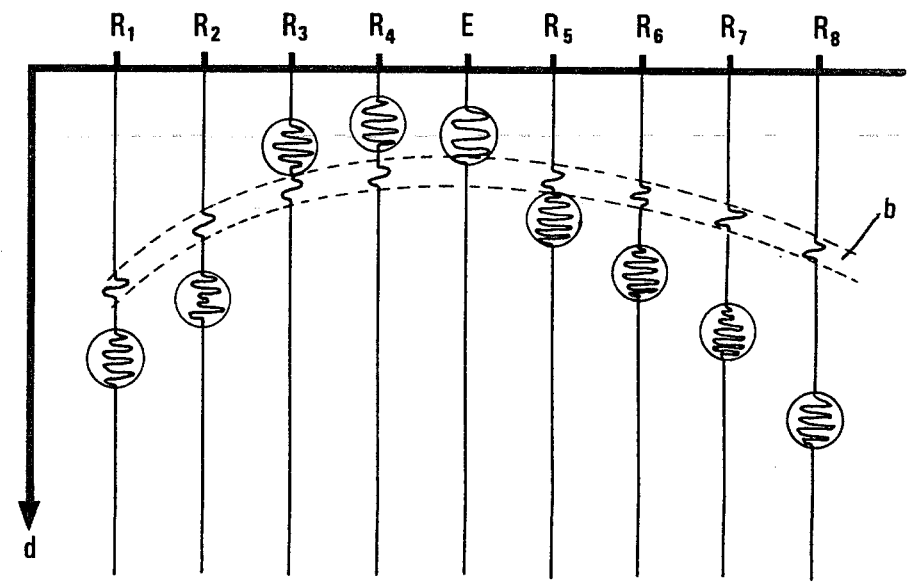
Figure 3:
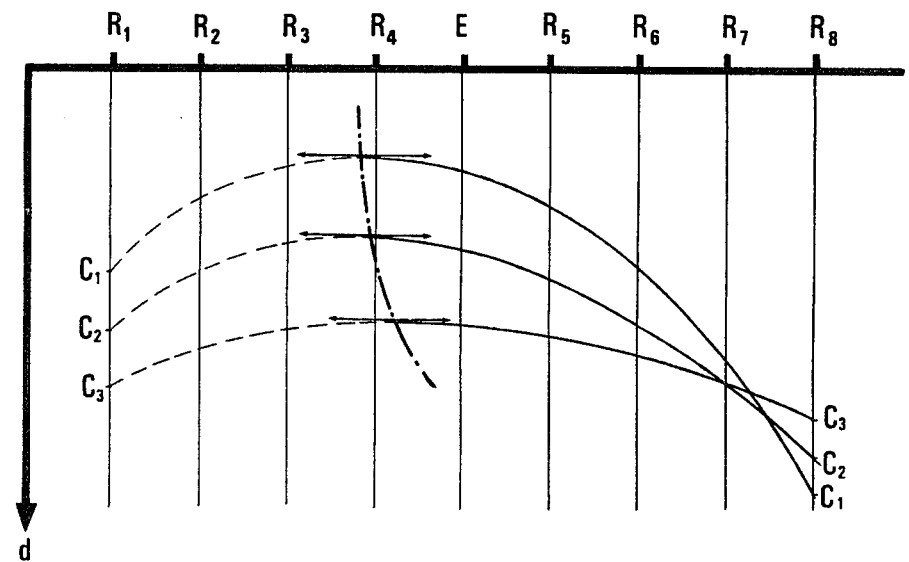
Figure 5:
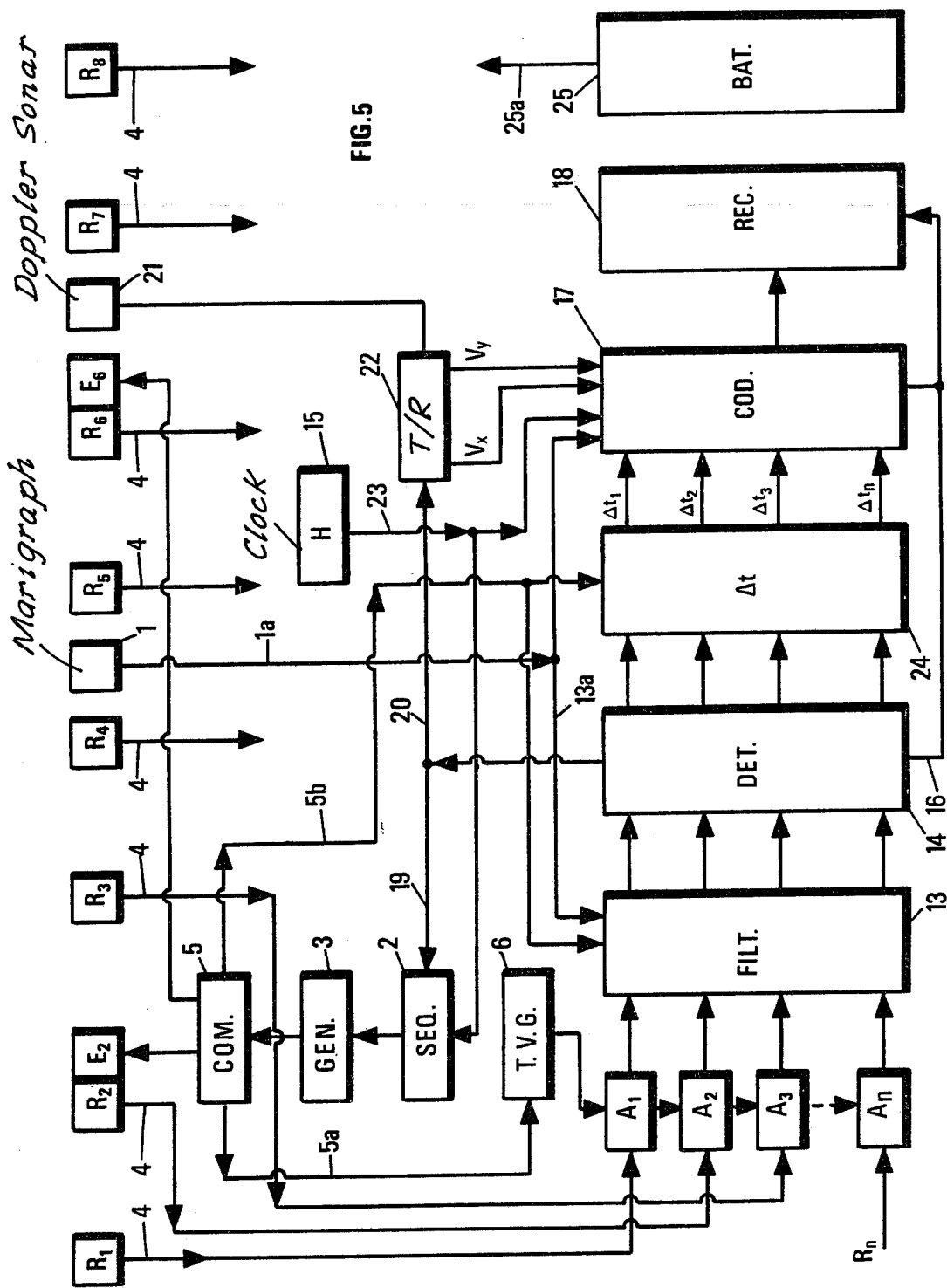
Figure 8:
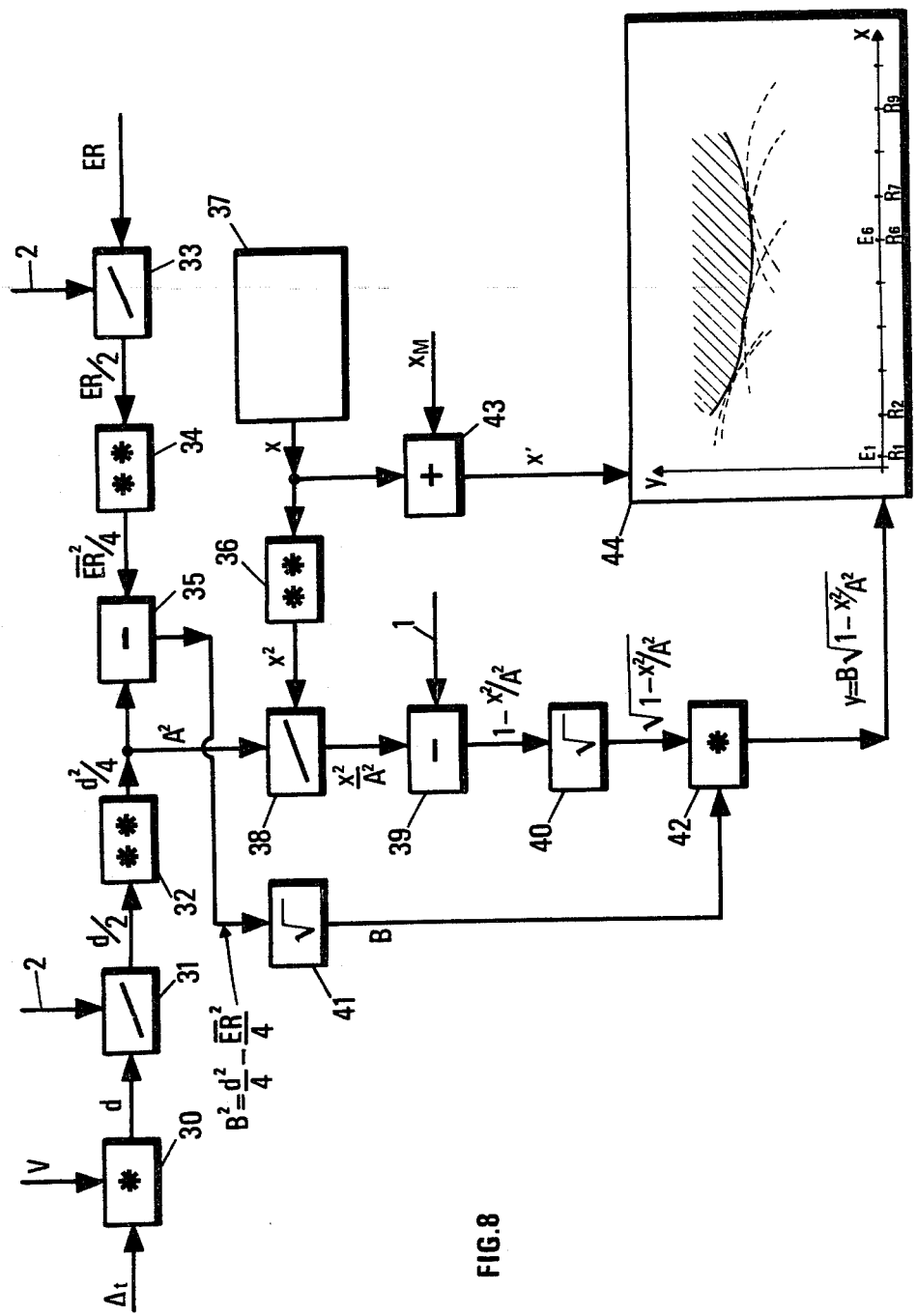
Figure 9:
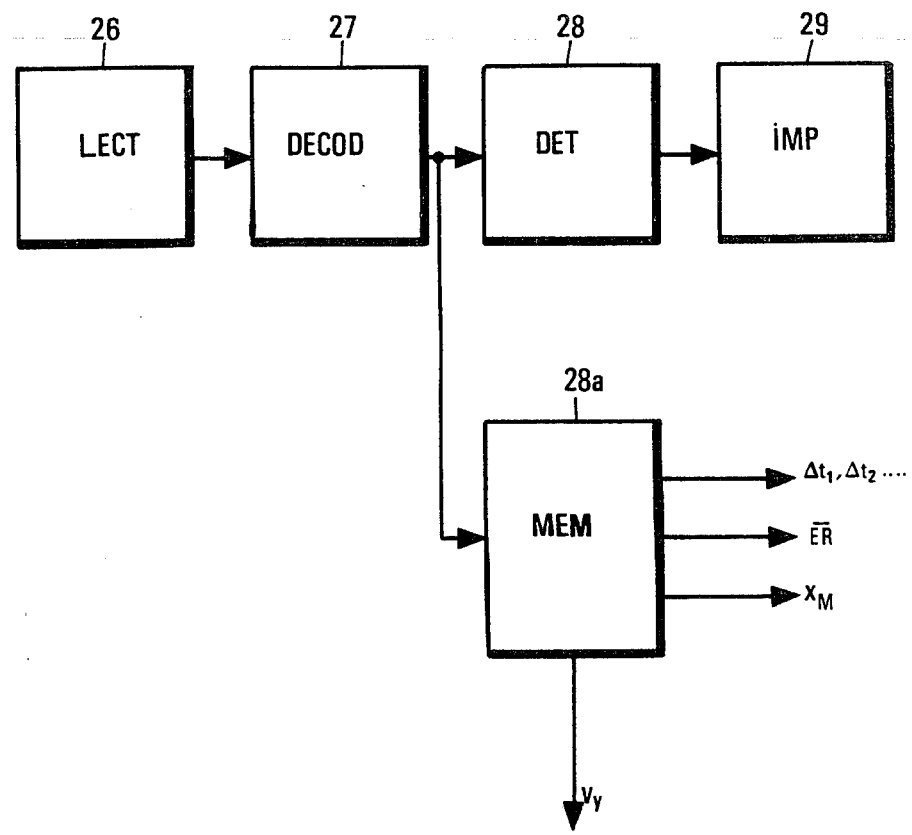

An embodiment of the invention is illustrated by the accompanying drawings, wherein:

FIG. 1 diagrammatically illustrates the method according to the invention,

FIGS. 2 and 3 diagrammatically shows recordings which can be obtained through this method, FIG. 4 illustrates the determination of the geometrical configuration of the underwater part of an iceberg, in cross-section by a vertical plane passing through the lowermost point of the iceberg, FIG. 5 diagrammatically illustrates a device according to the invention for recording data on the underwater part of icebergs, FIGS. 5A and 5B shows example of the periodicity of the acoustic transmission, respectively in the stand-by or watching condition and in the operating condition of this device, FIG. 6 illustrates amplification means for the acoustic signals received by the apparatus, FIG. 7 shows an example of a recording obtained on a magnetic tape, FIG. 8 illustrates a set of circuits for processing the collected data, FIG. 9 diagrammatically shows a device for reading the collected data and, FIG. 10 illustrates means for determining the route followed by the iceberg.

FIG. 1 diagrammatically illustrates an embodiment of the invention comprising a line of acoustic transducers. These transducers comprise an acoustic transmitter E and, on both sides thereof, a plurality of hydrophones ($R_1, R_2 \ldots R_n$) located on the water bottom, substantially along a straight line.

The drawing also shows an iceberg I whose direction of drift P'P (indicated in dashed line) is at an angle to the transducer line.

These transducers should be of a substantially omnidirectional type for the whole half-space located above the water bottom, the transmitter E transmitting upwardly oriented acoustic signals (arrows) at a frequency preferably between 5,000 and 500,000 Hertz, so that these signals are mainly propagated through water where they are reflected on the icebergs (there is practically no propagation through the geological layers under the water bottom at these frequencies, and consequently no risk of parasitic reflections from such layers).

By way of example, 5 to 50 hydrophones may be used with a spacing there between of 10 to 1,000 meters.

Optionally transmitter E will not be exactly located on the hydrophone line, but in the vicinity of this line.

A plurality of transducer lines have been used, each of them comprising one or several acoustic transducers. The transducer lines will not be necessarily straight but it is possible to consider them as substantially rectilinear in the vicinity of the transmitter.

At least some of the transducers may be of a type capable of both transmitting and receiving acoustic signals.

When an iceberg is approaching a transducer line, such as that of FIG. 1, there are recorded the time intervals elapsing between the transmission of an acoustic signal from a transmitter such as E (this transmission having a duration of some milliseconds) and the reception of this signal by the different hydrophones $R_1$, $R_2$ . . . $R_n$, after reflection on the underwater part of an iceberg. Knowing the velocity of propagation of the acoustic waves through water, it is possible to deduce from these time intervals the distances of propagation of the acoustic signals received by the different hydrophones. These distances are plotted on a graph where the different transducers are marked on a straight line separated by distances proportional to their spacing in the transducer line.

FIG. 2 diagrammatically illustrates an example of recording which can be so obtained. In this drawing "d" designates the propagation distance of this signals.

The sensed signals corresponding to an acoustic reflection by the iceberg are indicated by circles in FIG. 2.

Each hydrophone also senses a parasitic signal corresponding to a reflection by the sea surface.

Such parasitic signals forming the band "b" in FIG. 3 may be cancelled by using in a known manner, before the recording, "windows" or gates to delete such parasitic signals at the reception, the time of propagation of the acoustic signals reflected by the water surface, in the absence of any iceberg, being known for each hydrophone for a given water depth.

An apparatus of a known type called a marigraph, or self-registering tide-gauge measuring this water depth at the location of the hydrophone line, or in the vicinity thereof, is connected to the recording device so as to automatically shift the position of the above defined gates as a function of the variations in the water depth with the tide.

FIG. 3 shows the successive recordings obtained when an iceberg is approaching a hydrophone line, passes over it and then moves away therefrom. For each position of the iceberg the signals (echoes) received by the hydrophones are distributed along a curve having a minimum (minimum distance of travel corresponding to the reflection of the acoustic signal on the lowest part of the iceberg). There is thus obtained curves $C_1$, $C_2$, $C_3$ . . . corresponding to the successive positions of the iceberg. From the minima of these curves $C_1$, $C_2$, $C_3$ . . . the route followed by the iceberg may be substantially determined, by applying a correction which is a function of the velocity of the iceberg,, in a manner indicated below.

Moreover from the electric signals representing the travel time of the acoustic pulses through water, it is possible to reproduce, according to the invention, the geometrical shape of the underwater part of the iceberg, in cross-section by a vertical plane passing through the transmitter and the receivers located on both sides of this transmitter, in the vicinity thereof.

In fact, the travel time of each acoustic pulse corresponds to the time used by the latter to travel over the minimum distance between transmitter and receiver, with a reflection on the iceberg. Consequently the point of reflection of this pulse on the iceberg is located in a plane which is tangent to the ellipsoid of revolution whose foci are the transmitter and the receiver and whose major or transverse axis has a length equal to the distance "d" over which the acoustic pulse has travelled. It is thus possible to define for each acoustic transmitter a number of ellipsoids equal to the number of receivers in operation and, at a given time, the outline of the underwater part of the iceberg is the envelope (with the geometrical meaning of this word) of this system of ellipsoids (some of these ellipsoids are in fact spheres, in the particular case where a transducer is both transmitter and receiver, or when the receiver is located in the immediate vicinity of the transmitter).

The invention provides a good approximation of the outline of the cross-section of an iceberg by a vertical plane passing through the hydrophone line (FIG. 4) at the time where the lowermost point of this iceberg passes through this vertical plane (this moment corresponds to the minimum minimorum of the travel time of the acoustic pulses).

This outline is defined by curve $\Gamma$ (FIG. 4) which is the envelope of the ellipses whose foci are the transmitter and receiver of a transmitter-receiver pair, the length of the major axis of each ellipse being equal to the distance of propagation of an acoustic pulse between the acoustic transmitter and receiver corresponding to this ellipse, at the time where the lowermost point of the iceberg passes through the above-defined vertical plane (this distance being deduced from the travel time of this pulse)

The approximation, when laying out the outline of the underwater part of the iceberg, will obviously become better with an increased number of transmitter-receiver pairs.

The determination of the above $\Gamma$ provides, in particular, the draught h of the iceberg (FIG. 4).

FIG. 5 represents the diagram of the electrical connections between the different elements of a device according to the invention for detecting the icebergs. It has been assumed in this embodiment that two of the transducers can act at will as transmitter or/and receiver of acoustical signals: (transducers $E_2$ - $R_2$ and $E_6$ - $R_6$) the control of the transmission by either of said transducers is achieved by switch (COM.)5.

It is possible, according to the invention, to provide a device with one or several transmitters separate from the acoustic receivers, or in which all the transducers can act at will as transmitter or/and receiver and are, to this end, all connected to switch (COM.5).

In FIG. 5, $R_1$, $R_2$, $R_3$, $R_4$ . . . $R_n$ represent the hydrophones which receive the reflected acoustic signals transmitted by $E_6$, or by $E_2$.

Since the occurences detected by the device must be exclusively the passage of icebergs, some parasitic echoes, due for example to the reflection of signals by the sea surface, must be eliminated. To this end the immersion depth of the device must be known and therefore a marigraph which may be of any known type is placed on the hydrophone line. This marigraph gives at any time the average height of the water surface above the water bottom.

The transmission chain is constituted as indicated below:

An electronic cadencer (SEQ)2 can be used for monitoring, at different frequencies, a generator of electric pulses (GEN)3. The frequency is normally a stand-by or watching frequency, with, for example, an actuation every 5 minutes, except in the case where an "occurence" has been detected by the detector (DET)14. In this case the actuation can, for example, occur every 30 seconds.

Each actuation produces a series of electrical transmissions by pulse generator 3, the pulses being distributed in sequence over the different acoustic transmitters by switch (COM)5. FIGS. 5a and 5b represent the transmission, as a function of time t, when, for example, three transducers-transmitters $E_1$, $E_2$, $E_3$ are available, during the watching periods (FIG. 5a) and during the measuring and recording steps (FIG. 5b) respectively performed during the passage of an iceberg. The reflected acoustic signals, which are sensed by receivers $R_1$, $R_2$...$R_n$, are transmitted, through wire 4, to a series of amplifiers $A_1$, $A_2$, $A_3$...$A_n$.

Each of these amplifiers has a gain control varying according to a certain law as a function of time, this law being supplied by a generator (TVG)6, so that the gain can be changed in dependence with the time of arrival of the signal, in order to compensate for the signal attenuation through water as a function of the length of its travel path therethrough. A connection 5a between switch (COM)5 and the generator (TVG)6 monitoring the gain variation makes it possible to initiate, for each transmission, the process of variation of the gain of amplifiers $A_1$ to $A_n$. The detail of amplifiers $A_1$, $A_2$...$A_n$ is given in FIG. 6. The generator of the variation law of the gain (TVG)6 actuates preamplifier; (PREA)7. A filter (FILT)8, tuned to transmission frequency $f_o$ and having a pass-band of about $f_o/10$ provides for a first elimination of parasitic signals.

An automatic gain control element (CAG)9 with a dynamic factor of about 40 dB permits an equalization of the signal amplitudes. Detection is achieved by detector (DET)10. The detected signal is compared to a reference signal supplied by a reference circuit (REF)11 to comparator (COMP)12. The signal delivered by this amplifier means may be considered as a "logical" signal of determined amplitude (for example 5 volts) transmitted to a circuit (FILT)13 for cancelling echoes from the surface or from stationary obstacles. This operation is carried out by closure of gates at the time of the expected reception of such parasitic echoes by the circuit (FILT)13. A connection 5b with switch (COM)5 permits identification of the transmitter to permit in each receiving chain deletion of the echoes from the sea surface, taking the tide into account through a connection 1a with marigraph 1. The latter will, for example, be of the type described in volume 1, page 236, chapter 5.5 of the book "Sea Surveying" of A. E. INGHAM (John WILEY & Son, 1975).

At the output of circuit (FILT)13 a plurality of lines corresponding to the different hydrophones either supply no signal (during the watching period when no iceberg is detected), or supply signals at time intervals $\Delta t_1$, $\Delta t_2$...$\Delta t_n$ from the acoustic transmission.

These signals are directed towards the detector of "occurences" (DET)14. The latter is adapted to detect a signal amplitude higher than a fixed threshold and the presence of such signals on several receivers, indicating then by a signal that an iceberg is within the range of the detection device.

Through conductor 16, the detector (DET)14 then energizes the coding device (COD)17 and the recording device (REC)18.

Conductor 19, connected to cadencer (SEQ)2, then switches the device to the fast transmission frequency (FIG. 5B) to permit the supply of the maximum of data on the draught, shape and route of the iceberg.

Conductor 20 actuates a DOPPLER sonar 21 by energizing the transmitter-receiver circuits 22 of this sonar. This DOPPLER sonar (which may, for example, by of the type described at page 115, Chapter 8.5 of the above quoted book) measures, in the form of two signals $V_x$ and $V_y$, the velocities of the iceberg along two axes respectively perpendicular and parallel to the hydrophone line which constitutes the measuring basis. Conductors transmit $V_x$ and $V_y$ respectively to the coding device (COD)17. The data from a clock (H)15 indicating the time and day of the occurrence are transmitted to the coding device (COD)17 through conductor 23. The signals, which have been validated and withheld after elimination of parasitic echoes by the circuit (FILT)13, and which have been used to initiate the measuring frequency, are then marked as to their time of transmission, by means of the telemetry circuit 24.

The latter thus provides data on the travel times $\Delta t_1$, $\Delta t_2$...$\Delta t_n$ corresponding to the different receivers, these data being also transmitted to the coding device (COD)17 and being then either stored on a magnetic tape, or in any other memory means, or transmitted by cable or radio to a real time processing system.

The coding device (COD)17 works out a seriate message as illustrated, for example, in FIG. 7. This message, which is recorded on the magnetic tape of the recording (REC)18, comprises, by way of example, in a "word" which relates to the measurement of an occurrence, the code of the word's beginning, the time or hour H and day, the height T of the tide, $V_x$, $V_y$, the identification of the transmitting transducer ($E_i$), the values $\Delta t_1$, $\Delta t_2$...$\Delta t_n$, the code of the word end.

In an autonomous version of the device according to the invention where the system is immersed on the water bottom, power is supplied by the electrical accumulator (BAT)25 which is connected, by conductors such as conductor 25a, to all the transmission, measuring and recording circuits.

When the signals $\Delta t_1$, $\Delta t_2$...$\Delta t_n$ are over, the cadencer 2 is shifted to its stand-by transmission frequency (FIG. 5A), and coding as well as recording are interrupted so as to spare power and the data storage means.

In the case where the system is connected through a wire to the shore, the coded message is transmitted through this wire which must preferably be a coaxial cable of good electrical quality and the required power may be supplied from the coast through the same wire.

The autonomy of the system is then infinite and the data are then processed in real time.

In a third embodiment, the recorder (REC)18 is replaced by a radio-transmitter mounted on a surface buoy and connected through an electric wire to the water bottom. The data are thus transmitted by radio in real time to a radio station located on a platform or onshore. In this case the safety of operation is lower because the radio buoy can be temporarily submerged or torn off by iceberg or surface vessels.

FIG. 8 illustrates an assembly of data processing circuits.

The locus of the possible reflections along an acoustic path between a transmitter and a receiver is an ellipsoid of revolution whose foci are the transmitter and the receiver point and whose major axis has a length equal to the distance corresponding to the underwater acoustic path.

At the time where the lowermost point of the iceberg, to which corresponds the maximum draught, passes just above the hydrophone basis, i.e. at the time of recording the value $\Delta t_k$ (at any receiver k) equal to the minimum minimorum, it can be assumed that the acoustic waves are propagated in the vertical plane passing through the hydrophone line. There must be determined the time H at which the point of maximal draught of the iceberg has passed through the vertical plane containing the transducer line.

To this end the recording magnetic tape of FIG. 7 is read on a tape reader (LECT)26 transmitting the data to a decoder (DECOD)27, and a detector of minima (DET)28 which controls printing on printer (IMP)29 of the value of this minimum $\Delta t_k$, of the time H, of velocity components $V_x$ and $V_y$ of the iceberg and of the height T of the tide, these last four parameters being supplied for information purpose only.

Moreover the output of decoder (DECOD)27 is connected to a memorizing circuit (MEM)28a which delivers the data $\Delta t_1, \Delta t_2 \ldots \Delta t_n$ and, for each of these time intervals, the distance $\overline{ER}$ between the transmitter and the considered receiver, the abscissa $x_M$ of the middle of each pair, transmitter-receiver relative to one end of the line, as well as the component $V_y$ of the iceberg velocity.

For each couple ER, the point of reflection on the iceberg is thus located on the ellipse contained in the vertical plane containing the hydrophone line, the foci of this ellipse being the transmitter and the receiver and its major axis having a length equal to the distance of propagation of the acoustic wave.

The equation of this ellipse is $x^2/A^2 + y^2/B^2 = 1$, wherein x is the distance of one point of the ellipse with respect to the center of the couple transmitter-receiver,
y is the height of said point above the water bottom,
A is half of the major axis of the ellipse, equal to D/2 (half the distance of propagation of the wave),
B is half of the ellipse minor axis.

This ellipse is reduced to a circle for transducers like $E_2$ - $R_2$ which are used both for transmitting and receiving (FIG. 5). The multiplier circuit 30 (FIG. 8) derives "d" from the travel time of the wave and from the sound velocity V through water (this value being known as a function of the water temperature)

$$d = \Delta t \times V$$

The dividing circuit 31 supplies a signal representative of d/2. The element 32 squares this signal to give a signal representative of $d^2/4$ which, owing to the definition of A, is equal to $A^2$.

The distance $\overline{ER}$ between transmitters and receivers is supplied by the memorizing circuit (MEM)28a of FIG. 9.

The dividing circuit 33 provides a signal representative of $\overline{ER}/2$ which is squared in circuit 34 to give a signal representative of $d^2/4 - \overline{ER}^2/4$ which is equal to $B^2$, square of the minor axis of the ellipse.

There is thus obtained $A^2$ and $B^2$ for the considered ellipse which is reduced to a circle if E and R are identical.

Squaring circuit 36 is fed with values of x comprised between −A and +A, for example 25 values uniformly distributed, to obtain the square of x, i.e. $x^2$, these 25 values being supplied by the programmed signal generator 37.

The circuit 38 which divides $x^2$ by $A^2$ supplies a signal representative of $x^2/A^2$.

The subtracting circuit 39 subtracts the value $x^2/A^2$ from 1, delivering a signal representative of $1 - x^2/A^2$.

The square root extracting circuit 40 gives $\sqrt{1 - x^2/A^2}$.

The square root extracting circuit 41 give $\sqrt{B^2} = B$.

Finally the multiplying circuit 42 gives a signal representative of the value y which is the ordinate of the point of abscissa x. This abscissa being measured with respect to the center of each ellipse, a common abscissa origin is selected for all the couples transmitter-receiver so as to facilitate drawing of the ellipse, this common origin being one end of the transducer line.

The new abscissa x' will be equal to x increased or reduced in the adding circuit 43 by a distance $x_M$ corresponding to the distance of the middle of $\overline{ER}$ from the end of the line.

An ellipse is drawn point by point for each couple transmitter-receiver on the drawing table 44.

The envelope of the ellipses gives a picture of the intersection of the iceberg with the vertical surface passing by the hydrophone line at the point of maximum draught h of the icebert.

FIG. 10 diagrammatically illustrates an assembly of circuits permitting determination point by point of the iceberg route by the method illustrated by FIG. 3.

Let be assumed, for example, that there is provided on a line, which can be considered as substantially straight on the selected portion, a plurality of transmitters $E_1, E_2 \ldots E_i$ regularly spaced by a distance "e" and, whose abscissa on the line is consequently $$i \times e$$

choosing one end of the line as the abscissa origin, i being the serial number of the transmitter.

Let $\Delta t_o$ be the time interval separating two acoustic transmissions.

The tape reader (LECT)26 delivers, through decoder (DECOD)27, a signal representative of the transmitter $E_i$ and the values $\Delta t_1, \Delta t_2 \ldots \Delta t_n$, this signal being supplied to a detector of minima DET)45.

When this detector detects a minimum $\Delta t_h$ in the assembly of the above values, it transmits to the multiplier circuit 46 a signal representing the serial number i of transmitter $E_i$.

Multiplier 46 delivers a signal proportional to $x_i = i \times e$, which is the transmitter abscissa.

This detector (DET)45 also delivers a signal proportional to the distance $\overline{E_i R_h}$, $R_h$ being the acoustic receiver to which corresponds the minimum $\Delta t_h$.

This signal is transmitted to a dividing-by 2 - circuit 47 which delivers a signal proportional to $$\overline{E_i R_h}/2$$

The signals delivered by circuits 46 and 47 are applied to an adding circuit 48 which thus delivers a signal proportional to $$x'' = x_i + (\overline{E_i R_h}/2),$$

i.e. substantially proportional to the abscissa of the reflection point of the iceberg corresponding to the minimum path between the transmitter $E_i$ and the receiver $R_h$ (abscissa of the center of the segment $E_i R_h$).

This abscissa x" is transmitted to the automatic curve tracer or plotter 51.

This curve tracer also receives a signal proportional to the distance "d" which the iceberg has travelled in the direction perpendicular to the transducer lines.

This signal is delivered by an assembly of two multiplier circuits 49 and 50, the first of which receiving from decoder (DECOD)27 a signal $V_y$ proportional to the component of the velocity of the iceberg in the direction perpendicular to the transducer line and multiply this signal by the value of a signal proportional to the time interval $\Delta t_o$ between two acoustic transmissions.

The multiplying circuit 49 thus delivers a signal proportional to the distance $\delta$ over which the iceberg has travelled between two acoustic transmissions in the direction perpendicular to the transducer line. This signal is transmitted to the multiplying circuit 50 which receives, in addition, from detector (DET)45, a signal proportional to the number n of transmitted acoustical signals.

Consequently circuit 50 delivers a signal which is proportional to the product n $\delta$, i.e. to the distance D over which the iceberg has travelled in the direction perpendicular to the transducer line, from the first acoustic transmission.

The curve tracer 51 thus records a point of the iceberg whose coordinates correspond to the minimum underwater acoustic path for the acoustic signal emanating from transmitter $E_1$.

When, for a given transmitter, the detector (DET)45 detects no minimum in the different paths of the acoustic signals, it delivers a signal to control circuit 52, which then causes tape reader (LECT)26 to read the recording obtained for another transmitter of the transducer line.

By connecting the so-obtained points on curve tracer 51 it is possible to obtain substantially the route P'P followed by the iceberg.

What I claim is:

1. A method for determining the geometrical configuration of icebergs and the draught thereof comprising laying in a fixed underwater location at least one line of acoustic transducers comprising at least one element for transmitting acoustic signals towards the water surface, and a plurality of acoustic receivers, said line of transducers being substantially contained in the same vertical stationary reference plane, this method comprising the combination of the following steps:
   (a) putting in energized condition this transducer line when an iceberg is approaching it,
   (b) monitoring then at regular time intervals the transmission of acoustic signals from said transmission element, some of said signals being reflected by the underwater part of the iceberg and reaching the acoustic receivers,
   (c) detecting said reflected signals, determining a set of values representing their propagation time between the transmitting element and at least some of the receivers of the line, located on both sides of said transmission element, and deducing from this determination the corresponding distances over which the acoustic signals have travelled, their propagation velocity through water being known,
   (d) repeating steps (b) and (c) so as to obtain different sets of values corresponding respectively to different transmitted acoustic signals, said different sets of values characterizing respectively different positions of the iceberg as it moves through the vertical stationary reference plane, and determining among said different sets of values a series of values comprising the minimum minimorum value of said propagation times, said series of values corresponding substantially to the passage of the lowest point of the iceberg in said vertical reference plane, and
   (e) deducing from said series of values of the propagation time, the geometrical configuration of the underwater part of the iceberg, in cross section by said vertical reference plane, and also the draught of the iceberg.

2. A method for determining the geometrical configuration of icebergs and the draught thereof comprising laying in a fixed underwater location at least one line of acoustic transducers comprising at least one element for transmitting acoustic signals towards the water surface, and a plurality of acoustic receivers, this method comprising the combination of the following steps:
   (a) putting in energized condition this transducer line when an iceberg is approaching it,
   (b) monitoring then at regular time intervals the transmission of acoustic signals from said transmission element, some of said signals being reflected by the underwater part of the iceberg and reaching the acoustic receivers,
   (c) detecting said reflected signals, determining their propagation time between the transmitting element and at least some of the receivers of the line, located on both sides of said transmission element, and deducing from this determination the corresponding distances over which the acoustic signals have travelled, their propagation velocity through water being known,
   (d) repeating steps (b) and (c) and determining a set of values comprising the minimum value of said propagation time for one and the same transmitted signal corresponding substantially to the passage of the lowest point of the iceberg in a vertical plane, and
   (e) deducing from said set of minimum values of the propagation time, the geometrical configuration of the underwater part of the iceberg, in cross section by said vertical plane, and also the draught of this iceberg, and determining substantially the iceberg route with respect to the transducer line, by combining the following steps:
   (f) transmitting said acoustic signals at regular time intervals successively from a plurality of transmitter means regularly spaced along said line,
   (g) determining for each transmitted signal whether there exists a minimum value of the travel time of said signal between said transmitter means and one receiver on said line, and producing a signal which represents the abscissa, measured on the transducer line, of the middle of the segment connecting said receiver to said transmitter means,
   (h) determining for each transmitted signal, the value of the component of the iceberg velocity in a direction substantially perpendicular to the transducer line and producing an ordinate signal representing the distance separating the iceberg from the transducer line at the transmission time of said acoustic signal, by summing the products of the values successively determined of said velocity component by the time interval between two successive transmissions, and
   (i) determining point by point the path of the iceberg by recording points whose coordinates are the abscissa and ordinates obtained in steps (g) and (h).

3. A device for determining the geometrical configuration of the immersed part of icebergs and the draught thereof, comprising the combination of the following elements:

(a) at least one line of acoustic transducers immersed in a stationary position, comprising at least one element capable of transmitting acoustic signals towards the water surface and a plurality of acoustic receivers, said line of transducers being substantially contained on the same vertical stationary reference plane, (b) means for activation of this transducer line when an iceberg is approaching, (c) means connected to said activation means for monitoring, at regular time intervals, the transmission of acoustic signals from said transmitting element, some of said signals being reflected by the underwater part of the iceberg and reaching the acoustic receivers, (d) means for detecting said reflected signals and means for determining their time of propagation between the transmission element and at least some of the receivers of the line, located on both sides of said transmission element, this propagation time being proportional to the distances of propagation through water of said reflected acoustic signals, and (e) means for remote transmission of the values of said propagation times to a data processing unit combined with means located at the data processing unit to determine, from a plurality of sets of received acoustic signals corresponding respectively to different transmitted acoustic signals, a series comprising the minimum minimorum value of said propagation times corresponding substantially to the passage of the lowermost point of the iceberg in said vertical reference plane, and means connected to the minimum minimorum determining means, to deduce from said series comprising said minimum minimorum value, the geometrical configuration of the immersed part of the iceberg, in cross-section by said vertical stationary reference plane, and the draught of the iceberg.

4. A device according to claim 3, wherein at least some of the transducers can at the same time transmit and receive acoustic signals.

5. A device according to claim 3, comprising immersed means for recording said propagation times.

6. A device according to claim 3, wherein said transmission means comprise a connection cable to the data processing unit.

7. A device according to claim 3, wherein said transmission means comprise means for radio transmission to said data processing unit.

8. A device for determining the geometrical configuration of the immersed part of icebergs and the draught thereof, comprising the combination of the following elements:

(a) at least one line of acoustic transducers immersed in a stationary position, comprising at least one element capable of transmitting acoustic signals towards the water surface and a plurality of acoustic receivers, (b) means for activation of this transducer line when an iceberg is approaching, (c) means connected to said activation means for monitoring, at regular time intervals, the transmission of acoustic signals from said transmitting element, some of said signals being reflected by the underwater part of the iceberg and reaching the acoustic receivers, (d) means for detecting said reflected signals and means for determining their time of propagation between the transmission element and at least some of the receivers of the line, located on both sides of said transmission element, and means for remote transmission of the values of said propagation times to a data processing unit, this propagation time being proportional to the distances of propagation through water of said reflected acoustic signals, the different series of propagation times thus determined for different transmitted acoustic signals permitting the determination of the geometrical configuration of the iceberg and of the draught thereof, and further comprising electric circuits to substantially determine the path of the iceberg with respect to the transducer lines, these circuits comprising the combination of the following elements:

(e) means for successively transmitting acoustic signals at regular time intervals from a plurality of transmission means regularly spaced along said line, (f) detecting means determining for each transmitted signal whether there exists a minimum value of the propagation time of this signal between the transmission means and one receiver of the line, said detection means being adapted to deliver a signal representing the abscissa, measured on the transducer line, of the middle of the segment connecting this receiver to the transmission means, (g) measuring means delivering an ordinate signal representing the distance separating the iceberg from the transducer line at the transmission time of each acoustic signal, and (h) recording means, connected to said detection means and to said measuring means, said recording means giving the iceberg path through successive points having coordinates respectively proportional to the signals delivered by said detection means and by said measuring means.

* * * * *